United States Patent [19]

Burkard et al.

[11] Patent Number: 5,443,281
[45] Date of Patent: Aug. 22, 1995

[54] VARIOUSLY POSITIONABLE PIVOT JOINT CONNECTION FOR WHEEL GUIDE ARMS IN MOTOR VEHICLES

[75] Inventors: Walter Burkard, Holzgerlingen; Ewald Ulrich, Schwaikheim; Helmut Reichelt, Denkendorf, all of Germany

[73] Assignee: Mercedes-Benz AG, Stuttgart, Germany

[21] Appl. No.: 289,390

[22] Filed: Aug. 12, 1994

[30] Foreign Application Priority Data

Aug. 12, 1993 [DE] Germany .................. 43 27 021.2

[51] Int. Cl.⁶ .................................................. B62D 17/00
[52] U.S. Cl. ........................................ 280/661; 403/3; 403/4
[58] Field of Search .............. 280/661; 403/3, 4, 65, 403/70, 71, 151, 160

[56] References Cited

U.S. PATENT DOCUMENTS

| | | | |
|---|---|---|---|
| 3,526,413 | 9/1970 | Muller | 280/661 |
| 4,424,984 | 1/1984 | Shiraton et al. | 280/661 |
| 4,863,187 | 9/1989 | Artz | 280/661 |
| 5,080,388 | 1/1992 | Berry et al. | 280/661 |
| 5,129,669 | 7/1992 | Specktor et al. | 280/661 |
| 5,163,699 | 11/1992 | Specktor | 403/4 X |

Primary Examiner—Randolph A. Reese
Assistant Examiner—Andrea Chop
Attorney, Agent, or Firm—Evenson McKeown Edwards & Lenahan

[57] ABSTRACT

An adjustably positionable pivot joint connection assembly for wheel guide arms in motor vehicles For the purpose of centering connection bolts in oblong holes, the latter are provided with centering snugs arranged on their end faces and directed towards one another. The centering snugs engage the bolt to hold it in its center position in certain rotative positions of the bolt. The bolt includes a longitudinally extending notch which engages over one of the centering snugs when in an end position of the oblong hole, rotated so the notch is aligned with the snug.

6 Claims, 2 Drawing Sheets

VARIOUSLY POSITIONABLE PIVOT JOINT CONNECTION FOR WHEEL GUIDE ARMS IN MOTOR VEHICLES

BACKGROUND AND SUMMARY OF THE INVENTION

The invention relates to a variously positionable pivot joint which has a nut and bolt connection, particularly for wheel guide arms in motor vehicles. The bolt extends through two legs of a mounting bracket, at least one of which legs has an oblong hole to accommodate adjustable positioning of the bolt.

Variously positionable pivot joints of the above-mentioned type are, for example, customary in the pivoting of wheel guide arms for motor vehicles. They make it possible, starting from a central position aimed at in series production assembly, to fix eccentric positions shifted to either side. One object in doing so is to make it possible for variations in camber and castor resulting from minor collisions, such as, for example, violent contact with a curb to be corrected to such an extent that the tolerance range for castor and camber permissible for series production purposes and for safe operating behavior, is restored. Such corrections would otherwise necessitate bodywork intervention, for example, realignment of the vehicle body, which is necessary after more serious accidents but for such minor collisions would entail unacceptable expense.

The adjustability in question necessitates for series production assembly at least centering on the bolt head side, for example, by means of eccentric discs or the like, but it is preferable for such centering to be provided on both the bolt head and the threaded end nut side.

Adjustment devices known for this purpose already require for series production assembly a setting with corresponding adjustment within the tolerance range. Assembly errors cannot be ruled out by this means. Moreover, the cost for such pivot joints is relatively high.

An object on which the invention is based is to provide a variously positionable joint which offers simplified adjustability for camber and castor and in addition reduces the risk of error in series production assembly.

This object is achieved according to preferred embodiments of the invention by providing that the oblong hole guide has snugs which extend from ends of the oblong hole toward one another, the backs of the snugs forming a guide corresponding to a central position of the bolt, engageable over one of the snugs to accommodate an end eccentric positioning of the bolt, and wherein a stop engaging in the oblong hole is provided for supporting the bolt at a side opposite the snug when in the end eccentric position.

The oblong hole guide according to the invention makes it possible, when it is arranged in the bracket leg on the nut side of the mounting bracket, to achieve centering to a central position on the head side within the framework of the invention, for example, by means of a shaped projection which is provided on the head side and engages in the oblong hole. However, it also makes it possible, when it is arranged in both the legs, to achieve by means of the oblong hole guide the centering of the bolt on the head side and on the nut side.

Deviations from the central position, that is to say, a displacement of the bolt to one or the other of its end positions, are possible with the configuration of the oblong hole guide according to the invention by providing the bolt with a corresponding notch in relation to the respective oblong hole provided with the centering snugs. If the bolt is inserted in such a manner that the notch and the groove coincide, the bolt is to be displaced laterally inside the oblong hole until the back of the snug is supported in the bottom of the notch, and the respective end position can be fixed in a simple manner by supporting the bolt in the opposite direction by a shaped member engaging in the oblong hole. This shaped member may, for example, be in the form of a shaped projection associated with a shim, for example, a stamped-out part of the shim.

In principle, it is possible within the framework of the invention to use identical shaped bolts for series production assembly and for repair purposes, provided that the shaped bolts are provided with corresponding means preventing them from turning. However, a particularly simple solution consists in that for the serial production assembly use can be made of a conventional bolt without a special head configuration or the like, and in that for repair purposes a Dolt is used which has the corresponding notches and with which shims having a corresponding shaped projection are associated. Since the shaped projection on the shim is on one side only, by turning the shim over and correspondingly inserting the bolt, each of the two end positions can be fixed in a simple manner by using the same shims and the same bolts.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
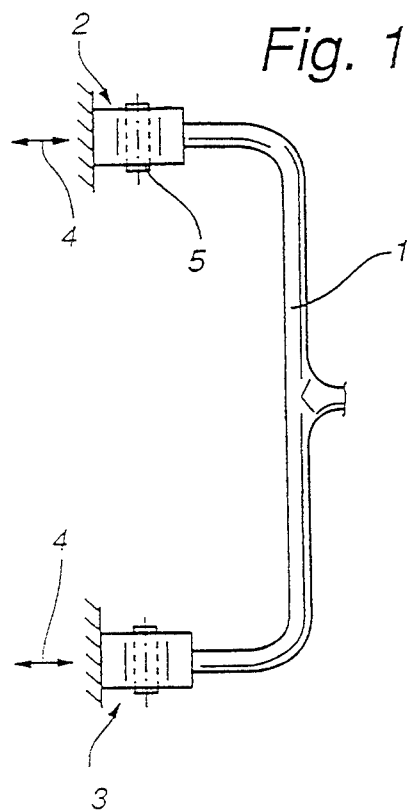
FIG. 1 shows schematically the basic arrangement of a wheel guide arm mounted in two brackets, in accordance with preferred embodiments of the present invention.

In the illustration shown in FIG. 1, 1 designates a wheel guide arm which is held in two mounting brackets 2 and 3 on the vehicle body, the transverse adjustment of the pivot joints of the wheel guide arm 1 in the brackets 2, 3 making it possible ten vary the camber and/or castor for the wheel (not shown) guided by the guide arm 1. The given adjustment directions are symbolized by the arrows 4.

Figure 2:
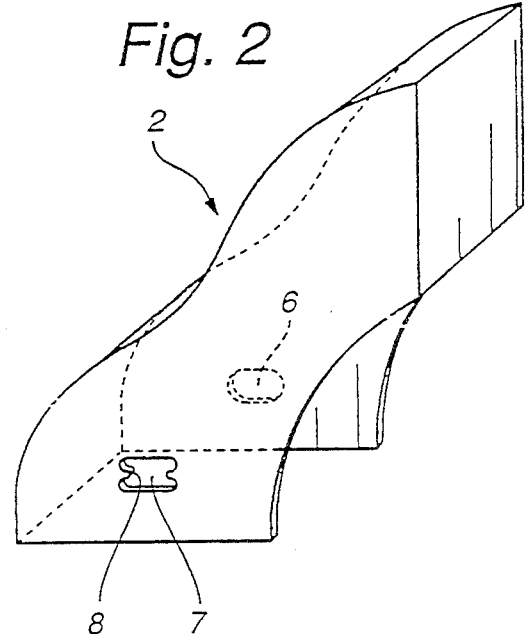
FIG. 2 is a perspective view of a mounting bracket which has an oblong hole configuration according to the invention only on the nut side.

FIG. 2 shows schematically a view in perspective of a bracket 2 of this kind. The wheel guide arm is not shown, nor is one of the bolts which are used to fasten the wheel guide arm in the brackets and which are schematically illustrated in FIG. 1 and designated 5.

Oblong holes guides 6 and 7 arranged in the adjustment direction indicated by the arrows 4 are provided in the brackets for these bolts. The oblong hole guide associated with the bolt head is designated 6 in FIG. 2 and the oblong hole guide associated with the threaded part of the bolt, that is to say, the oblong hole guide on the nut side, is designated 7.

If a bolt, which for example, is provided on both sides at the head end with a shaped projection engaging in the oblong hole 6, is inserted into a bracket according to FIG. 2, the bolt is centered at its head end to its central position in the oblong hole 6. The corresponding centering at the thread end is effected by the centering snugs 8 which are provided in the oblong hole 7 and the dimensions of which are adapted to the diameter of the bolt, so that they guide the bolt, so to speak, by their backs.

Figure 3:
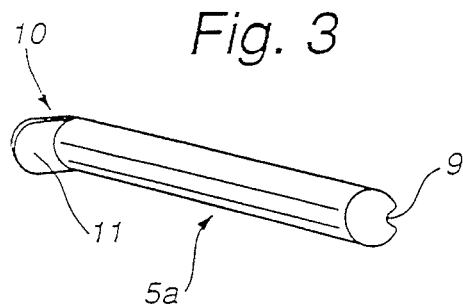
FIG. 3 is a perspective view of a bolt having on one side a shaped projection provided at the head end and having, situated opposite said projection, a notch provided in the threaded region, constructed according to a preferred embodiment of the invention.

If in one of the brackets, for example, the bracket 2, the wheel guide arm 1 is to be given one of the possible eccentric end positions for a bolt 5, use can be made of a bolt 5a according to FIG. 3, which for the oblong hole 7 permits a corresponding eccentric position of the bolt 5a by the provision on the latter of a notch 9 extending in the direction of the bolt. On the rear side of the head 10, the bolt 5a is provided, in the opposite direction to said notch 9, with a shaped projection 11, which extends only towards one side and which, on displacement of the bolt to the corresponding end face of the oblong hole 6 on the opposite side to the notch, fills the oblong hole on said opposite side and thereby ensures the fixing of the bolt 5a in the corresponding end position.

Figure 4:
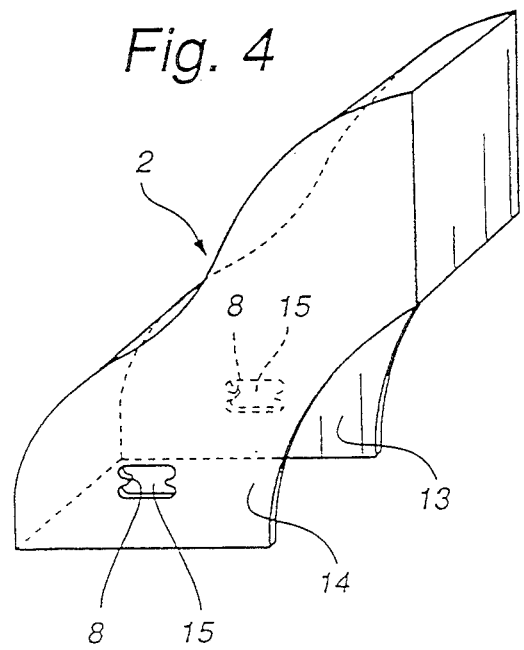
FIG. 4 is a view similar to FIG. 2, with oblong holes having a configuration according to the invention provided in both brackets.

If use is made of a solution according to the invention in which, in accordance with FIG. 4, an oblong hole 15 having centering snugs 8 is used in each of the two legs 13 and 14 of the bracket 2, then in the case of a bolt having a circular cross-section the bolt is centered both at the head end and at the nut end.

Figure 5:
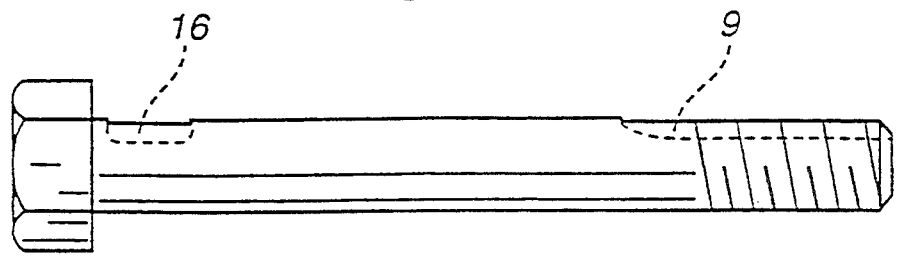
FIG. 5 is a side view of a bolt having notches provided in both the head end and the nut end, constructed according to a preferred embodiment of the invention.

If an eccentric end position is to be ensured for the bolt, a bolt is provided in accordance with FIG. 5 with a notch 9 in the nut region and another notch 16 in the head region, the notches 9 and 16 having to correspond to the corresponding snugs 8 in the oblong holes 15.

Figure 6:
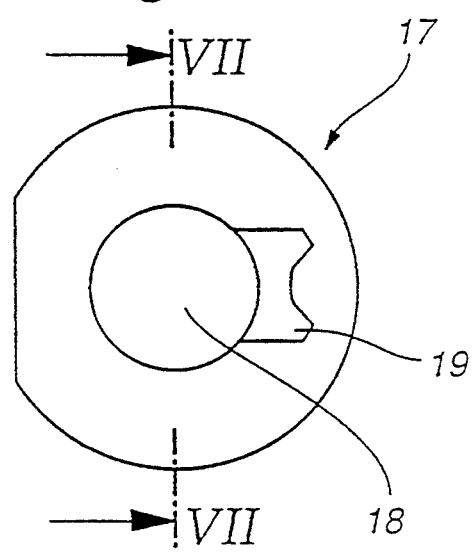
FIG. 6 is a plane view of a shim having a shaped projection on one side, constructed according to a preferred embodiment of the invention.
Figure 7:
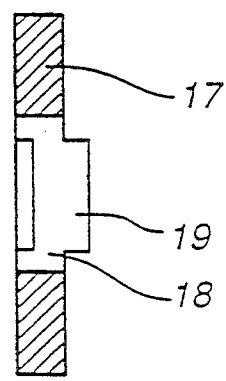
FIG. 7 is a sectional view take along line VII—VII of FIG. 6.

FIGS. 6 and 7 show shims 17 such as are used when a bolt according to FIG. 5 is to be fixed in an eccentric end position in oblong holes 15 according to FIG. 4. The shims 17 have a central guide bore 18 for the bolt, and in addition, as shown at 19, they are provided with a shaped projection which, when the bolt is in an eccentric position in the respective oblong hole, fills the free space between the bolt and the oblong hole snug remote from the notch. The bolt is thereby fixed in its respective eccentric position by means of the shim.

Figure 8:
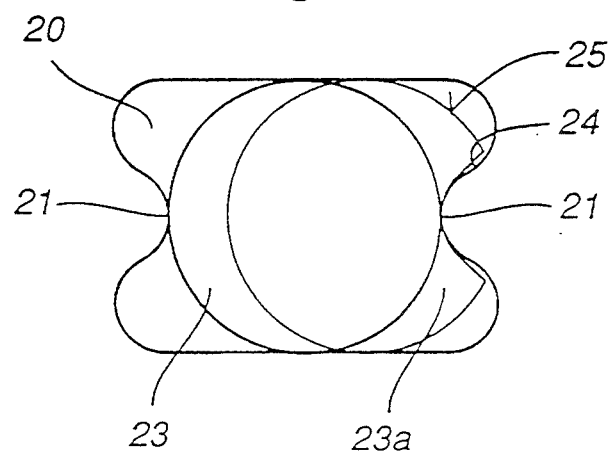
FIG. 8 is a schematic illustration explaining the support of the bolt in its central position between the backs of the snugs and with the snug engaging with the notch.

FIG. 8 shows, on a larger scale, the configuration of an oblong hole 20 having oppositely disposed centering snugs 21 and with a bolt 23 in a central position, in which the bolt is guided between the backs of the snugs 21. The bolt 23 is shown with a thickened contour line. If the bolt, now designated 23a and shown with a thinner contour line, assumes an eccentric position, the snug 21 coincides with a notch 24, and this illustration on a larger scale makes it possible to see that contact between the notch 24 and the snug 21 should be made only in the immediate region of the snug backs, that is to say, at the apex of the snug 21 and at the bottom of the notch 24. As can be seen, the notch otherwise lies free in relation to the snug, particularly towards the periphery 25 of the bolt, in order to avoid deformation of the edge region at the transition to the periphery 25 of the shaped bolt 23a, whereby damage could be caused to the bolt screw thread situated in the nut region.

On the right-hand side, the bolt 23a is supported against the snug 21, while on the left-hand side a free space is left between the bolt 23a and the corresponding snug 21. When a shim according to FIGS. 6 and 7 is used to support the bolt in the oblong hole, this free space is filled by the shaped projection 19 provided there on the shim 17.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An adjustably positionable pivot joint connection assembly for wheel guide arms in motor vehicles, comprising:

a mounting bracket having two facing spaced apart legs, and a bolt extending through the legs, said bolt being adjustably positionable in the mounting bracket in an adjustment direction transverse to a longitudinal direction of the bolt between a central position and end positions on respective opposite sides of the central position, wherein an oblong hole guide extending in the adjustment direction is provided in at least one of the legs to receive the bolt, wherein the oblong hole guide has snugs which extend from ends of the oblong hole guide toward one another, backs of said snugs forming abutment guides locating the bolt in its central position, wherein the bolt includes a notch engageable over one of the snugs to accommodate locating the bolt in an end position, and wherein a stop engaging in the oblong hole is provided for supporting the bole at a side opposite the engaged notch and snug when the bolt is in an end position.

2. A joint connection assembly according to claim 1, wherein a shim having a guide bore for the bolt is provided and the stop is located on the shim.

3. A joint connection assembly according to claim 2, wherein the stop is in the form of a shaped projection on the shim.

4. A joint connection assembly according to claim 1, wherein the oblong hole guide having the snugs is provided in a mounting leg on a nut side end of the bolt.

5. A joint connection assembly according to claim 1, wherein an oblong hole guide having snugs is provided in each leg of the mounting bracket.

6. A joint connection assembly according to claim 5, wherein notches are provided on the bolt corresponding to the snugs of the oblong hole guides of both legs of the mounting bracket and are located in the head and nut regions of the bolt.

* * * * *